United States Patent [19]

DaGue

[11] Patent Number: 5,094,296

[45] Date of Patent: Mar. 10, 1992

[54] LIGNIN AMINE MICROEMULSIONS

[75] Inventor: Michael G. DaGue, Houston, Tex.

[73] Assignee: Texaco Inc., White Plains, N.Y.

[21] Appl. No.: 591,161

[22] Filed: Oct. 1, 1990

[51] Int. Cl.$^5$ .............................................. E21B 43/22
[52] U.S. Cl. .................................... 166/275; 166/274; 252/8.554
[58] Field of Search ........................ 166/273, 274, 275; 252/8.554

[56] References Cited

U.S. PATENT DOCUMENTS

| 4,006,779 | 2/1977 | Kalfoglou | 166/273 X |
| 4,271,907 | 6/1981 | Gale | 166/274 |
| 4,353,806 | 10/1982 | Canter et al. | 166/273 X |
| 4,384,997 | 5/1983 | Detroit | 166/274 X |
| 4,611,659 | 9/1986 | DeBons et al. | 166/274 |
| 4,822,501 | 4/1989 | DeBons et al. | 166/274 X |
| 4,946,606 | 8/1990 | Osterloh | 166/274 X |

OTHER PUBLICATIONS

Prince, Leon M., *Microemulsions: Theory and Practice*, Academic Press, New York, 1977, p. 34.

Drew Myers, *Surfactant Science and Technology*, VCH Publishers, New York, 1988, pp. 172, 178.

Tadros, Th. F., "Influence of Structure and Chain Length of Surfactant on the Nature and Structure of Microemulsions", *Structure Performance Relationships in Surfactants*, American Chemical Society, 1984, p. 154.

*Primary Examiner*—George A. Suchfield
*Attorney, Agent, or Firm*—Jack H. Park; Kenneth R. Priem; Harold J. Delhommer

[57] ABSTRACT

The invention is a method of recovering hydrocarbons from an underground hydrocarbon formation having at least one injecting well and at least one production well which comprises injecting a microemulsion into the formation through an injection well, driving said microemulsion through the formation and producing hydrocarbons through a production well, said microemulsion comprised of an internal phase of a primary amine having from about 8 to about 22 carbon atoms, lignin, a water-soluble anionic sulfonate surfactant, a solubilizer and an oil, and an external phase of brine.

13 Claims, 1 Drawing Sheet

LIGNIN AMINE MICROEMULSIONS

BACKGROUND OF THE INVENTION

The present invention concerns a method of recovering hydrocarbons from underground formations by the use of a microemulsion comprising lignin and amine components.

A microemulsion is a stable, clear or translucent solution comprised of oil, water, and surfactant. The microemulsion may also contain one or more electrolytes, cosurfactants, and when used for enhanced oil recovery, water-soluble polymers and sacrificial agents. The droplet diameters of the dispersed phase range from roughly 140 to 10 nanometers.

Microemulsions may be classified as oil-in-water microemulsions, water-in-oil microemulsions, and middle-phase microemulsions. An oil-in-water microemulsion is a microemulsion in which the external or continuous phase is water and the dispersed phase is oil. A surfactant-water mixture which forms an oil-in-water microemulsion can equilibrate as a single phase or as two phases such as a lower phase oil-in-water microemulsion plus an equilibrium upper phase of oil, depending on the overall composition of the mixture. Such mixtures are defined by those skilled in the art of surfactant flooding as existing in a Type II(−) phase environment.

A water-in-oil microemulsion is a microemulsion in which the external or continuous phase is oil and the dispersed phase is water. A surfactant-oil-water mixture which forms a water-in-oil microemulsion can equilibrate as a single phase or as two phases such as an upper phase water-in-oil microemulsion plus an equilibrium lower phase of water depending on the overall composition of the mixture. Such mixtures are defined by those skilled in the art of surfactant flooding as existing in a Type II(+) phase environment.

A middle-phase microemulsion is a microemulsion in which there is apparently no identifiable external or continuous phase. The structure of the middle-phase microemulsion is still unresolved. A surfactant-oil-water mixture which forms a middle phase microemulsion can equilibrate as a single phase, as two phases of a middle-phase microemulsion plus an equilibrium phase of oil or water, or as three phases. The three phases would be a middle-phase microemulsion plus an equilibrium water phase and an equilibrium oil phase. The end result of the equilibrated microemulsion depends on the overall composition of the mixture. Such mixtures are defined by those skilled in the art of surfactant flooding as existing in Type III phase environments or regimes.

A macroemulsion is a thermodynamically unstable, opaque dispersion of two or more insoluble liquids, one in the other. It is characterized by its propensity to separate into two or more original liquid phases upon standing. The droplet diameters of the dispersed phase range from roughly 200 nanometers to visually resolvable, discreet aggregates. Because of the propensity of a macroemulsion to separate into its components, macroemulsions are not desirable surfactant systems for enhanced oil recovery.

Microemulsions may be used for different chemical purposes. One well known use for oil-in-water microemulsions is to recover oil from underground formations by using the microemulsion in the same fashion as a surfactant slug. But because of the complex phase chemistry involved in microemulsions, the components and concentrations of successful enhanced oil recovery surfactant systems do not necessarily make successful microemulsions, or vice versa. U.S. Pat. Nos. 3,506,070; 3,778,381; 3,981,361; 4,146,499; 4,271,907; 4,318,816; 4,472,291 and 4,946,606 describe the use of various oil-in-water microemulsions for oil recovery.

Oil-in-water microemulsions generally perform better when they are formulated with high equivalent alkane carbon number (EACN) oils having an EACN 50% to 300% higher than the EACN of the crude oil for which the microemulsion is optimized. U.S. Pat. No. 4,318,816 demonstrates that the stability of a single component surfactant such as an alkylarylpolyalkoxyalkylene sulfonate is enhanced when a high EACN oil is added to an aqueous surfactant to form an oil-in-water microemulsion. The high EACN oil raises the phase inversion temperature of the ethoxylated surfactant. U.S. Pat. No. 4,271,907 teaches that water soluble polymers are compatibly incorporated into an optimized microemulsion only when the microemulsion is formulated with a high EACN oil.

U.S. Pat. Nos. 4,756,370, 4,821,803 and 4,822,501 disclose the use of lignin amine surfactant systems wherein a surfactant slug contains water soluble lignin, amine and anionic surfactant. U.S. Pat. No. 4,548,721 claims the use of a surfactant slug to recover oil containing the reaction product of an amine and a lignin.

SUMMARY OF THE INVENTION

The invention is a method of recovering hydrocarbons from an underground hydrocarbon formation having at least one injection well and at least one production well which comprises injecting a microemulsion into the formation through an injection well, driving said microemulsion through the formation and producing hydrocarbons through a production well. The water or brine external microemulsion is comprised of a primary amine having from about 8 to about 22 carbon atoms, lignin, a water-soluble anionic sulfonate surfactant, a solubilizer and an oil, and an external phase of brine. The brine comprises greater than about 90% by weight of the microemulsion.

DETAILED DESCRIPTION

Figure 1:
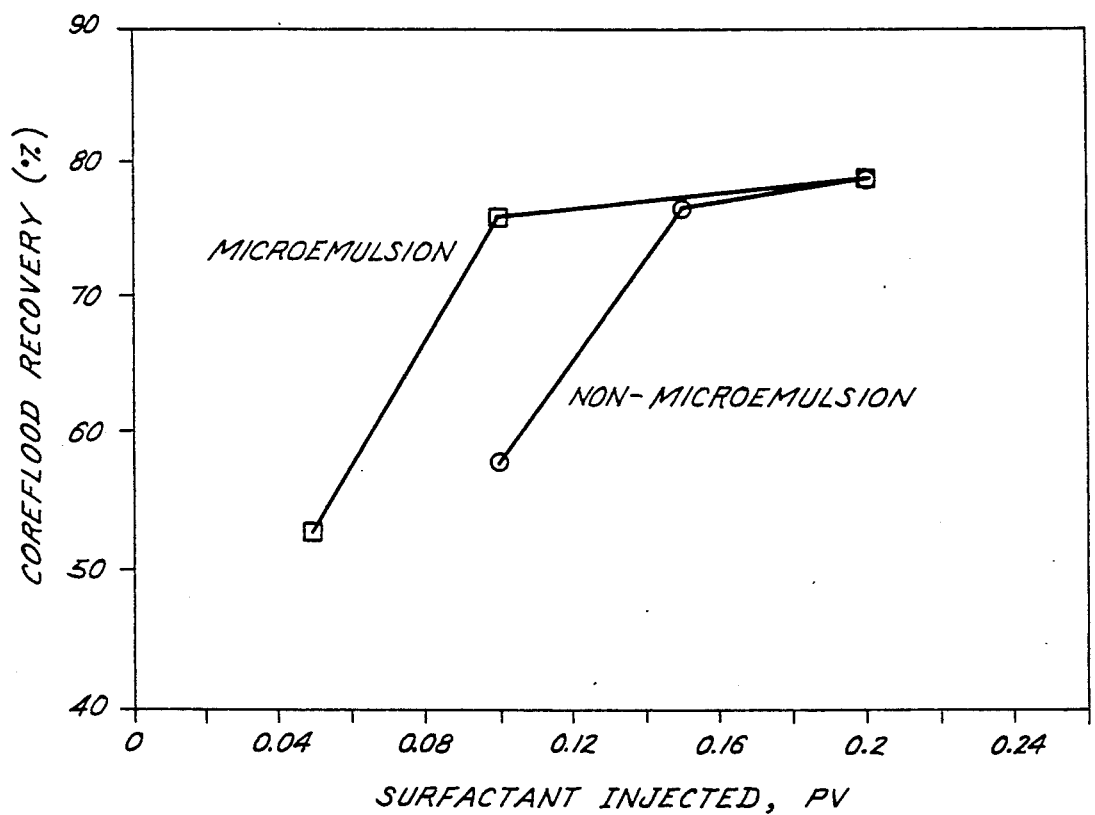
FIG. 1 is a graph illustrating coreflood recovery efficiencies for several microemulsion and non-microemulsion lignin amine surfactant systems.

After cellulose, lignin is the main component of trees, constituting about 30% of the weight of a tree. The paper industry retains cellulose to make paper, but considers lignin a nearly useless waste stream of billions of pounds per year. It is the hope of finding profitable uses for lignin that has driven countless paper company research programs over the last few decades.

The use of lignin products offer substantial benefits over prior art surfactants in both cost and availability. The cost of lignosulfonate is low, about five cents per pound. By comparison, the commonly used components of microemulsion systems derived from petroleum cost 8 to 15 times as much as lignosulfonate. A second cost benefit is that the price of lignin is not tied to the price of oil. Traditional enhanced oil recovery chemicals are derived from petroleum and consequently increase in price when petroleum does.

A third cost benefit comes from lignin availability. Lignin production is already so large that full scale usage in the United States for enhanced oil recovery would not require additional capacity as would be needed for traditional enhanced oil recovery chemicals. Regardless of enhanced recovery demand, lignin would remain priced as a waste commodity. There are also many producers of lignin.

The enhanced oil recovery method of the present invention comprises injecting a microemulsion into an underground formation through an injection well, driving said microemulsion through the formation and producing hydrocarbons through a production well. The microemulsion is composed of an internal phase of several components and an external phase of brine, which comprises more than about 90% by weight of the microemulsion.

In addition to brine, the microemulsion contains lignin, a primary amine having from about 8 to 22 carbon atoms, a water-soluble anionic sulfonate surfactant, a solubilizer and an oil. These components are present in the microemulsion in the range of about 0.1% to about 0.8%, preferably about 0 1% to about 0.3% primary amine, about 0.5% to about 2.5%, preferably about 0.75% to about 1.5% lignin, about 0.1% to about 2%, preferably about 0.5% to about 1.25% anionic sulfonate surfactant, about 0.2% to about 2%, preferably about 0.5% to about 1.25% solubilizer, and about 0.2% to about 5%, preferably about 0.5% to about 3% oil by weight.

The oil dispersed within the microemulsion preferably has an EACN higher than the hydrocarbons produced from the formation. Higher EACN oils in a microemulsion aid in the stability of the microemulsion, particularly when a polymer is added to the microemulsion. Mineral oil or white oil may be employed, although less expensive fractions or whole crudes may be used.

Lignins which may be used include lignosulfonates and oxidized or sulfonated alkali lignins. The lignosulfonates may have sodium, magnesium, calcium, or ammonium cations. Hardwoods, softwoods, or other sources are suitable to provide the lignin. Further processing to remove sugars and other carbohydrates either by chemical reaction or fermentation is possible. The lignins may also have been processed to reduce the molecular weight or desulfonate the lignin. Vanillin lignins may be used. A non-modified kraft lignin is not effective with the present invention since it lacks water solubility. Thus, lignosulfonates or modified kraft lignins (usually oxidized or sulfonated) are effective. As used herein, the term lignin refers to those lignosulfonates or modified lignins which are effective in the invention system.

The amine is a primary amine having about 8 to about 22, most preferably about 14 to 22 carbon atoms Tallow amine is preferred.

A wide range of anionic water-soluble surfactants may be used in the invention microemulsion. Among the useful anionic surfactants are: petroleum sulfates, alkoxylated alkyl sulfonates or sulfates, alkoxylated alkylaryl sulfonates or sulfates, alkylsulfonates and alkylarylsulfonates. The most preferred surfactants are water-soluble petroleum sulfonates.

A solubilizer or cosurfactant is needed to add stability to the microemulsion. Some possible solubilizers are: alkylphenol ether sulfates and sulfonates, alcohol ether sulfates and sulfonates, carboxylated alcohol ethoxylates, carboxylated alkylphenol ethoxylates, alkyl diphenyloxide disulfonates, and others. A preferred solubilizer is an alkylphenol ether sulfate.

The microemulsion external phase of brine may have widely varying salinities. The invention microemulsion has been produced with brine ranging from about 23,000 ppm TDS to about 68,000 ppm TDS, of which 3800 PPM is due to divalent ions. It is believed that substantially fresher or saline brine could be employed as the external phase.

Polysaccharide or polyacrylamide may be incorporated within the internal dispersed phase of the microemulsion. The use of such a polymer, particularly the preferred polyacrylamide can result in better volumetric sweep efficiency during a flood. In addition, some of the invention microemulsions tested with added polysaccharide showed improved phase stability in comparison to non-microemulsion lignin amine formulations containing polysaccharide. Some microemulsions with the polyacrylamide were stable for three to seven days before phase separation occurred. As is customary with enhanced oil recovery flooding, a polymer may also be used in a drive fluid to improve the driving of the microemulsion through the reservoir to the production wells.

As noted in U.S. Pat. No. 4,946,606 the disclosure of which is incorporated herein by reference, there are numerous ways to prepare microemulsions. Unfortunately, the common laboratory methods of preparation are generally not feasible for use in the field. These include heating and then cooling the mixture as well as subjecting the mixture of components to a high shear, or a heat and shear method used in the instant examples.

U.S. Pat. No. 4,946,606 discloses a method of preparing a microemulsion concentrate which can be later diluted with field make-up-water of the proper salinity to form the desired oil-in-water microemulsion to be injected. Allowed U.S. patent application Ser. No. 200,873, filed June 1, 1988, now U.S. Pat. No. 4,971,707, incorporated herein by reference, discloses another method of preparing oil-in-water microemulsions which is suitable for field use. It is believed that the instant lignin amine microemulsion may be prepared for field use by these two practical methods, or other possible methods.

The following examples will further illustrate the novel method of the present invention of recovering hydrocarbons from an underground formation by the use of a lignin amine microemulsion. These examples are given by way of illustration and not as limitations on the scope of the invention. Thus, it should be understood that the composition of the lignin amine microemulsions may be varied to achieve similar results within the scope of the invention.

EXAMPLE 1

All lignin amine microemulsions in these examples were prepared in the same manner. Adogen 170, a trademarked tallow amine sold by Sherex Chemical Co; TRS-40S, a trademarked water-soluble petroleum sulfate having an average equivalent weight of about 348 sold by Witco Chemical Co.; Lignosite 458, a trademarked softwood sodium lignosulfonate sold by Georgia Pacific Corp.; Polystep B-1, a trademarked alkylphenol ether sulfate sold by Stepan Co.; and Semtol 350, a trademarked technical grade mineral oil sold by Witco Chemical Co., were added to a brine having a salinity 2.25 times that of the desired final brine salinity.

The mixture of components and brine was stirred and heated at 80° C. for ten minutes and shaken vigorously once or twice during heating to dissolve all tallow amine. The mixture was then sheared for about one-half to two minutes in a homogenizer designed for use with tissue. Immediately after shearing, room temperature deionized water was added to yield the desired brine concentration and form the microemulsion. The result was an optically translucent microemulsion.

Although lignin amine microemulsions have been prepared having different concentrations of internal dispersed components, all of the examples were prepared with the same component concentrations with the exception of dispersed mineral oil. The microemulsions contained 0.2% Adogen 170, 1.12% Lignosite 458, 0.84% TRS-40S, 0.84% polystep B-1, and 0.75% or 2.5% Semtol 350 by weight. Unless otherwise noted, the brine concentration of all microemulsions was 68,000 ppm TDS, of which about 3800 ppm is due to divalent ions.

EXAMPLE 2

565 ppm of Flocon 4800M was added to the Example 1 microemulsion as a dispersed phase. The microemulsion with polymer was phase stable for over three days when left to stand undisturbed. Flocon 4800M is a trademarked xanthan polysaccharide having an approximate molecular weight of about 6 million sold by Pfizer, Inc.

Several lignin amine microemulsions with added polymer were stable up to 7 days before phase separation occurred. Similarly composed lignin amine surfactant/polymer systems were unstable, undergoing phase separation in about five hours.

EXAMPLE 3

For comparison purposes, a non-microemulsion lignin amine surfactant system was prepared having the same concentrations and salinity as the Example 1 microemulsion except that the Semtol 350 mineral oil was absent. Preparation involved stirring and heating the mixture to 80° C. for one hour to insure melting and proper mixing of the tallow amine.

565 ppm of Nalco 3857 polyacrylamide was added to this non-microemulsion lignin amine surfactant system. The surfactant/polymer system separated into two phases in about 4 to 6 hours. Nalco 3857 is a trademarked partially hydrolyzed polyacrylamide with an average molecular weight of 10-15 million sold by Nalco Chemical Co.

EXAMPLES 4-7

The Example 1 lignin amine microemulsion was treated in corefloods at different levels of mineral oil concentration and salinity and with different polymer drives. The Flocon polysaccharide polymer was also added to the microemulsion in two of the corefloods.

Each coreflood was carried out at 74° F. in an epoxy coated Berea sandstone core which measured 12"×2"×2". A dry evacuated core was initially saturated with a brine of 68,000 ppm TDS of which 3,800 ppm was due to divalent ions. Permeability was then determined (averaging about 300 millidarcies for the cores). The core was saturated with a Southern Illinois crude having an API gravity of about 36° to an irreducible water saturation which corresponded to an average oil saturation of 0.61. The core was then waterflooded with the same brine to an irreducible oil saturation of about 0.39.

The surfactant flood began with the injection of a 0.2 pore volume slug of lignin amine microemulsion (with or without incorporated Flocon polysaccharide), followed by a fresh water brine containing a mobility control polymer. For Examples 6 and 7, the viscosity of the 1,500 ppm Flocon 4800M polysaccharide (in a fresh water brine of 341 ppm TDS with 94 ppm divalent ions) drive fluid was 90 cp (3 rpm Brookfield, UL adapter) and 57 cp (6 rpm Brookfield, UL adapter). For all other corefloods, the drive fluid polymer was 1,500 ppm of Nalco 3857 in the fresh water brine. Frontal advance rate was one foot per day.

For the Example 4 microemulsion without polymer, oil production started at about 0.35 produced pore volumes and ended at about 1.3 produced pore volumes. There was a sustained high oil cut of about 40%. Recovery was an excellent 79%.

The recovery efficiency of 79% is conservative because it has been adjusted downward to correct for all mineral oil injected as part of the microemulsion surfactant slug. The uncorrected recovery efficiency for the Example 4 coreflood was 80%. All coreflood recovery efficiencies reported herein have been corrected for oil in the microemulsions. The results of Examples 4-7 are reported in Table b 1.

TABLE 1

LIGNIN AMINE MICROEMULSION COREFLOODS

| Ex. | Microemulsion | | Polymer Drive | $E_R$ |
|---|---|---|---|---|
| | Mineral Oil, Wt % | Salinity, ppm TDS | Polymer | | |
| 4 | 0.75 | 68,000 | None | Polyacrylamide | 79% |
| 5 | 2.50 | 54,400 | 565 ppm Polysaccharide | Polyacrylamide | 78% |
| 6 | 2.50 | 54,400 | None | Polysaccharide | 69% |
| 7 | 2.50 | 54,400 | 565 ppm Polysaccharide | Polysaccharide | 70% |

The addition of polymer to a surfactant slug or microemulsion is desirable because it results in better volumetric sweep efficiency. Although improved conformance control is generally not apparent in coreflood results due to the small cross section and geometry of laboratory cores, such an advantage is important in the field.

The addition of the polysaccharide to the microemulsion in the Example 5 coreflood gave a 78% recovery efficiency, virtually the same as the Example 4 coreflood without the incorporated polysaccharide. Coreflood recoveries within 2 percentage points of each other are considered to be the same within experimental error.

It is worth noting that the Example 5 microemulsion with incorporated polysaccharide is the same microemulsion/polymer system of Example 2. This system proved stable over three days without phase separation. The viscosity of the microemulsion with incorporated polymer was 17 cp (6 rpm Brookfield, UL adapter), compared to the crude oil viscosity of 7 cp. These relative viscosities should aid in conformance control. Oil cuts during the coreflood held constant for a sustained period, giving further evidence of the feasibility of this system for field flooding.

The use of the polysaccharide polymer drive instead of the polyacylamide drive fluid lowered recovery efficiencies to the 69-70% of Examples 6-7. These recoveries are the same within experimental error. Thus, coreflood recovery for both polymer drives was independent of the addition of the polysaccharide to the microemulsion itself. However, these are laboratory corefloods. It is believed that the addition of the polysaccharide to the microemulsion would substantially improve recovery in a field flood due to greater conformance.

The recovery efficiencies of Examples 6 and 7 are excellent for polysaccharide polymer drives. Although the recovery decreased 8-10% from the use of the polyacrylamide drive, the recovery efficiency of coreflood Examples 6 and 7 was substantially better than the 49-53% recovery efficiencies obtained for similar polysaccharide drive corefloods with non-microemulsion lignin amine surfactant slugs.

An additional advantage occurred with the addition of the polysaccharide to the microemulsion slug. Oil breakthrough occurred earlier at 0.2 produced pore volumes in Example 5 as compared to Example 4 oil breakthrough at 0.32 produced pore volumes. Such an earlier oil breakthrough would substantially improve the cash flow of a field project and could mean the difference between economic success and failure in the field.

EXAMPLES 8-13

Additional lignin amine microemulsion corefloods were conducted with smaller slug sizes and without polymer in the microemulsion. The technical advantage of using a smaller pore volume slug is that the overall cost of injected chemicals is less. The results of the Example 8-10 corefloods are shown below in Table 2 compared with the Example 4 coreflood having a 0.2 pore volume slug.

TABLE 2

| LIGNIN AMINE MICROEMULSION COREFLOODS | | | |
|---|---|---|---|
| Ex. | Mineral Oil, wt % | Slug Pore Volume | $E_R$ |
| 4 | 0.75 | 0.2 | 79% |
| 8 | 0.75 | 0.1 | 75% |
| 9 | 2.5 | 0.1 | 76% |
| 10 | 2.5 | 0.05 | 53% |

The corefloods of Examples 11-13 (Table 3) were run with non-microemulsion lignin amine surfactant systems having varying slug sizes and polymer only in the drive fluid. As in Example 3, these non-microemulsion lignin surfactant systems had the same components (except for the mineral oil) and concentration as the microemulsion systems. Preparation was according to the Example 3 procedure.

TABLE 3

| NON-MICROEMULSION, LIGNIN AMINE SURFACTANT SYSTEM COREFLOODS | | |
|---|---|---|
| Ex. | Slug Pore Volume | $E_R$ |
| 11 | 0.2 | 79% |
| 12 | 0.15 | 76% |
| 13 | 0.1 | 58% |

The recovery efficiencies of Tables 2 and 3 indicate a substantial advantage for the lignin amine microemulsions over the non-microemulsion lignin amine surfactant systems at lower slug volumes. For example, the injection of the 0.1 pore volume non-microemulsion slug of Example 13 gave a recovery efficiency of 58%. The injection of the same amount of chemicals in the microemulsion form of Examples 8 and 9 gave recovery efficiencies of 75-76%, a 40% increase in recovery efficiency. Consequently, the lignin amine microemulsion is substantially more effective than the non-microemulsion formulation when a reduced amount of surfactant is injected. Reducing the amount of surfactant in half drops recovery only 3-4% for the microemulsion system and 21% (from 79% to 58%) for the non-microemulsion lignin amine formulation.

FIG. 1 graphically illustrates the advantage microemulsion systems show in recovery efficiency at lower surfactant pore volumes over the non-microemulsion surfactant systems having the same components (except oil) and concentration. The three points (squares) on the microemulsion recovery curve (left to right) are from Examples 10, 8 and 4, respectively. The three points (crosses) on the non-microemulsion recovery curve (left to right) are from Examples 13, 12 and 11, respectively. The retention of high recovery performance at lower levels of injected surfactant is a significant technical advantage for the lignin amine microemulsion system and would result in a lower cost per barrel of oil produced by chemical flooding.

COST COMPARISONS

Assuming a waterflood residual saturation of 0.39, a pore volume of 100 barrels and the following chemical costs (per active pound): Adogen-170-$0.65, Lignosite 458-$0.05, TRS-40S-$0.55, Polystep B-1-$0.80, and Semtol 350-$0.30, the non-microemulsion lignin amine formulation would cost $3.12 per barrel of produced oil.

The corresponding chemical costs for the lignin amine microemulsion floods of Example 4 and 8-10 are $3.66, $1.93, $2.55, and $1.83 per barrel of oil, respectively. The last three are less expensive than the non-microemulsion lignin amine formulation calculated above. The cost of the Example 4 coreflood system could be lowered to equal that of the non-microemulsion lignin amine system if the injected pore volume was decreased slightly to 0.17 from 0 2. As the data in FIG. 1 and the examples indicate, this lower pore volume should not decrease the core flood recovery to a significant degree. These costs are considerably lower than the costs of flooding with the petroleum sulfonate surfactant systems well known in the art.

The method of the present invention may be modified and changed by those skilled in the art without departing from the spirit or essential characteristics of the present invention. Accordingly, it should be completely understood that the concepts disclosed in this description are illustrative only, and are not intended as limitations on the scope of the invention.

What is claimed is:

1. A method of recovering hydrocarbons from an underground hydrocarbon formation having at least one injection well and at least one production well, comprising:
    injecting into the formation through an injection well a microemulsion comprising an internal phase of a primary amine having from about 8 to about 22 carbon atoms, lignin, a water soluble anionic surfactant, a solubilizer and an oil, and an external phase of brine comprising greater than about 90% by weight of the microemulsion;

driving said microemulsion through the formation; and producing hydrocarbons through a production well.

2. The method of claim 1, wherein the microemulsion comprises about 0.1% to about 0.8% primary amine, about 0.5% to about 2.5% lignin, about 0.1% to about 2.0% anionic sulfonate surfactant, about 0.2% to about 2% solubilizer, and about 0.2% to about 5% oil by weight.

3. The method of claim 1, wherein the microemulsion comprises about 0.1% to about 0.3% primary amine, about 0.75% to about 1.5% lignin, about 0.5% to about 1.25% anionic sulfonate surfactant, about 0.5% to about 1.25% solubilizer, and about 0.5% to about 3% oil by weight.

4. The method of claim 1, wherein the primary amine is a tallow amine.

5. The method of claim 1, wherein the oil has an EACN higher than the formation hydrocarbons.

6. The method of claim 1, wherein the oil is mineral oil.

7. The method of claim 1, wherein the solubilizer is an alkylphenol ether sulfate.

8. The method of claim 1, wherein the anionic surfactant is petroleum sulfonate.

9. The method of claim 1, wherein the lignin is lignosulfonate.

10. The method of claim 1, wherein the lignin is oxidized kraft lignin.

11. The method of claim 1, wherein the lignin is sulfonated kraft lignin.

12. The method of claim 1, wherein the internal phase is dispersed in droplets ranging from about 10 to about 140 nanometers in diameter.

13. A method of recovering hydrocarbons from an underground hydrocarbon formation having at least one injection well and at least one production well, comprising:

injecting into the formation through an injection well a microemulsion comprising an internal phase of about 0.1% to about 0.3% tallow amine, about 0.75% to about 1.5% lignosulfonate, about 0.5% to about 1.25% anionic petroleum sulfonate, about 0.5% to about 1.25% alkylphenol ether sulfate, and about 0.5% to about 3% of mineral oil, and an external phase of brine comprising greater than about 90% by weight of the microemulsion;

driving said microemulsion through the formation; and producing hydrocarbons through a production well.

* * * * *